US012578878B2

(12) United States Patent
Lee et al.

(10) Patent No.: US 12,578,878 B2
(45) Date of Patent: *Mar. 17, 2026

(54) STORAGE SYSTEM PROCESSING WITHOUT GLOBAL LOCKS

(71) Applicant: PURE STORAGE, INC., Santa Clara, CA (US)

(72) Inventors: Robert Lee, Pebble Beach, CA (US); John Hayes, Mountain View, CA (US); Igor Ostrovsky, Mountain View, CA (US); Peter Vajgel, Menlo Park, CA (US)

(73) Assignee: PURE STORAGE, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/781,801

(22) Filed: Jul. 23, 2024

(65) Prior Publication Data

US 2024/0377970 A1      Nov. 14, 2024

Related U.S. Application Data

(63) Continuation of application No. 17/548,112, filed on Dec. 10, 2021, now Pat. No. 12,067,260, which is a continuation of application No. 16/826,740, filed on Mar. 23, 2020, now Pat. No. 11,204,701, which is a continuation of application No. 16/017,968, filed on Jun. 25, 2018, now Pat. No. 10,599,348, which is a continuation of application No. 14/978,073, filed on Dec. 22, 2015, now Pat. No. 10,007,457.

(51) Int. Cl.
*G06F 3/06*          (2006.01)

(52) U.S. Cl.
CPC .......... *G06F 3/0622* (2013.01); *G06F 3/0637* (2013.01); *G06F 3/0659* (2013.01); *G06F 3/067* (2013.01); *G06F 3/0688* (2013.01)

(58) Field of Classification Search
CPC ..... G06F 3/0622; G06F 3/0637; G06F 3/0659
See application file for complete search history.

(56) References Cited

U.S. PATENT DOCUMENTS

| | | | |
|---|---|---|---|
| 7,975,115 B2 | 7/2011 | Wayda et al. |
| 8,504,797 B2 | 8/2013 | Mimatsu |
| 8,822,155 B2 | 9/2014 | Sukumar et al. |
| 9,280,678 B2 | 3/2016 | Redberg |
| 9,395,922 B2 | 7/2016 | Nishikido et al. |
| 10,324,639 B2 | 6/2019 | Seo |
| 10,567,406 B2 | 2/2020 | Astigarraga et al. |
| 10,846,137 B2 | 11/2020 | Vallala et al. |
| 10,877,683 B2 | 12/2020 | Wu et al. |
| 11,076,509 B2 | 7/2021 | Alissa et al. |
| 11,106,810 B2 | 8/2021 | Natanzon et al. |
| 11,194,707 B2 | 12/2021 | Stalzer |

(Continued)

*Primary Examiner* — Jae U Yu

(57) ABSTRACT

A method of processing transactions associated with a command in a storage system is provided. The method includes receiving, at a first authority of the storage system, a command relating to user data. The method includes sending a transaction of the command, from the first authority to a second authority of the storage system, wherein a token accompanies the transaction and writing data in accordance with the transaction as permitted by the token into a partition that is allocated to the second authority in a storage device of the storage system.

20 Claims, 7 Drawing Sheets

(56) References Cited

U.S. PATENT DOCUMENTS

| 2005/0039049 | A1* | 2/2005 | Chang .................... G06F 16/10 |
| | | | 726/4 |
| 2008/0256141 | A1 | 10/2008 | Wayda et al. |
| 2010/0306500 | A1 | 12/2010 | Mimatsu |
| 2014/0220561 | A1 | 8/2014 | Sukumar et al. |
| 2015/0154418 | A1 | 6/2015 | Redberg |
| 2016/0026397 | A1 | 1/2016 | Nishikido et al. |
| 2016/0182542 | A1 | 6/2016 | Staniford |
| 2016/0248631 | A1 | 8/2016 | Duchesneau |
| 2017/0262202 | A1 | 9/2017 | Seo |
| 2018/0054454 | A1 | 2/2018 | Astigarraga et al. |
| 2019/0220315 | A1 | 7/2019 | Vallala et al. |
| 2020/0034560 | A1 | 1/2020 | Natanzon et al. |
| 2020/0326871 | A1 | 10/2020 | Wu et al. |
| 2021/0360833 | A1 | 11/2021 | Alissa et al. |

* cited by examiner

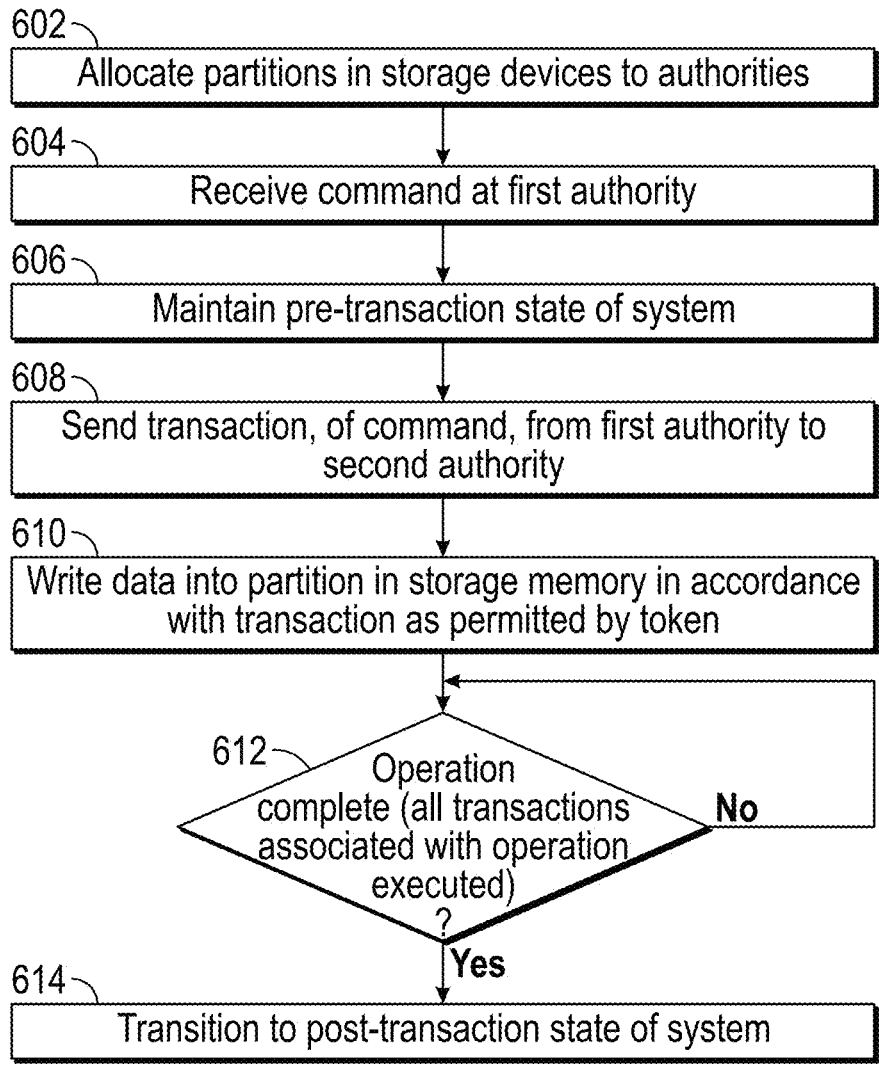

602
Allocate partitions in storage devices to authorities

604
Receive command at first authority

606
Maintain pre-transaction state of system

608
Send transaction, of command, from first authority to second authority

610
Write data into partition in storage memory in accordance with transaction as permitted by token 612
Operation complete (all transactions associated with operation executed)?

No

Yes

614
Transition to post-transaction state of system

FIG. 6

STORAGE SYSTEM PROCESSING WITHOUT GLOBAL LOCKS

CROSS REFERENCE TO RELATED APPLICATIONS

This application is a continuation application for patent entitled to a filing date and claiming the benefit of earlier-filed U.S. patent application Ser. No. 17/548,112, filed Dec. 10, 2021, which is a continuation application of U.S. patent application Ser. No. 16/826,740, filed Mar. 23, 2020, issued as U.S. Pat. No. 11,204,701 on Dec. 21, 2021, which is a continuation application of U.S. patent application Ser. No. 16/017,968, filed Jun. 25, 2018, issued as U.S. Pat. No. 10,599,348 on Mar. 24, 2020, which is a continuation application of U.S. patent application Ser. No. 14/978,073, filed Dec. 22, 2015, issued as U.S. Pat. No. 10,007,457 on Jun. 26, 2018, all of which are hereby incorporated herein by reference in their entirety.

BACKGROUND

Solid-state memory, such as flash, is currently in use in solid-state drives (SSD) to augment or replace conventional hard disk drives (HDD), writable CD (compact disk) or writable DVD (digital versatile disk) drives, collectively known as spinning media, and tape drives, for storage of large amounts of data. Flash and other solid-state memories have characteristics that differ from spinning media. Yet, many solid-state drives are designed to conform to hard disk drive standards for compatibility reasons, which makes it difficult to provide enhanced features or take advantage of unique aspects of flash and other solid-state memory. In a storage cluster environment, it may be difficult to maintain a consistent system state with distributed transaction and operation processing. One known mechanism for doing so, applying a global lock, during a transaction or operation, is effective but limits system bandwidth and throughput.

It is within this context that the embodiments arise.

SUMMARY

In some embodiments, a method of processing transactions associated with a command in a storage system is provided. The method includes receiving, at a first authority of the storage system, a command relating to user data. The method includes sending a transaction of the command, from the first authority to a second authority of the storage system, wherein a token accompanies or is associated with the transaction and writing data in accordance with the transaction as permitted by the token into a partition that is allocated to the second authority in a storage device of the storage system. A tangible, non-transitory, computer-readable media having instructions thereupon which, when executed by a processor, cause the processor to perform the method is also provided. A storage system comprising a memory and a processing unit having a processor configured to execute actions of the method is also provided.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 6 is a flow diagram of a method for processing transactions associated with an operation, which can be practiced in the storage cluster of FIGS. 1-5, in accordance with some embodiments.

DETAILED DESCRIPTION

Figure 1:
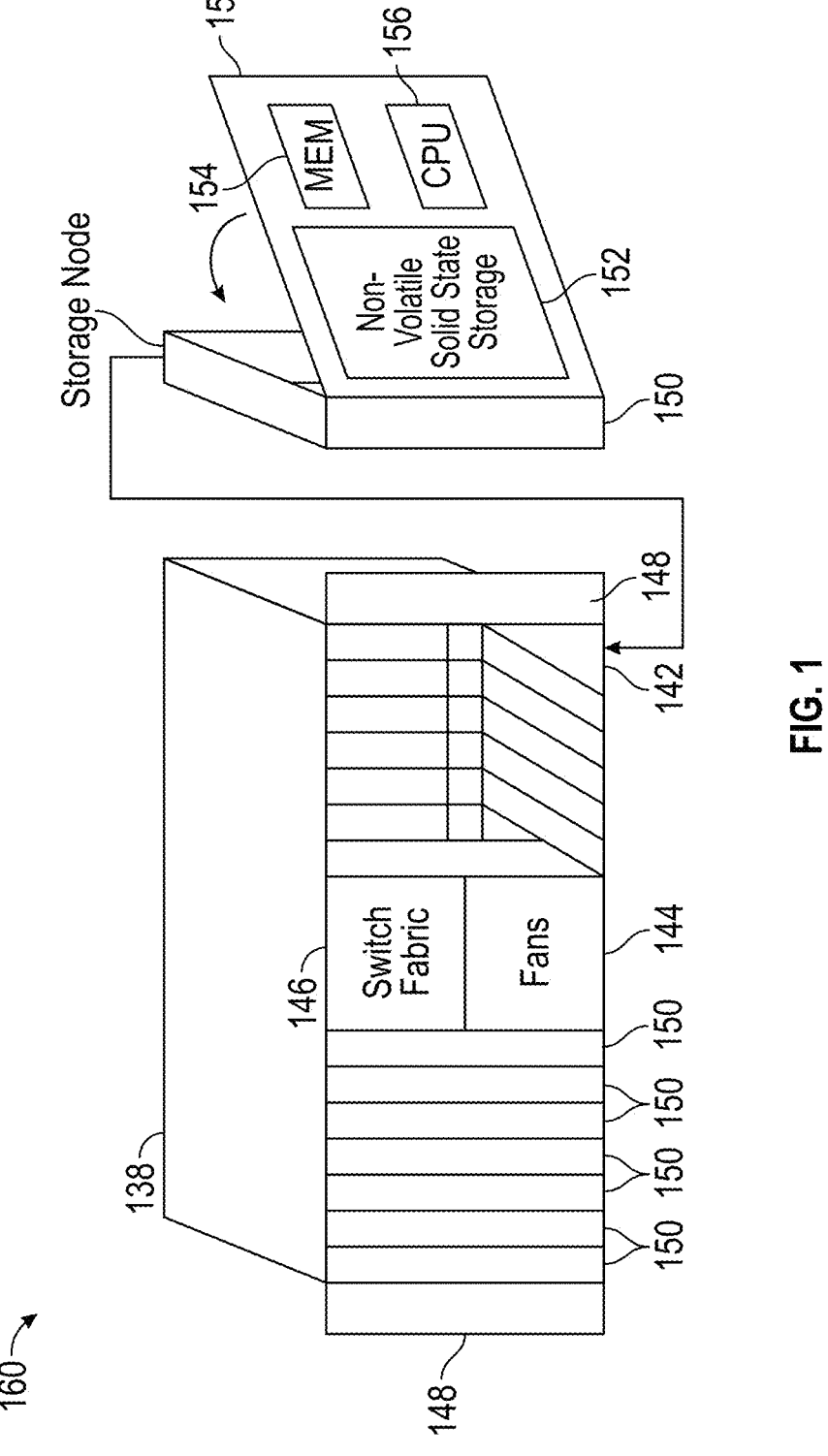
FIG. 1 is a perspective view of a storage cluster with multiple storage nodes and internal storage coupled to each storage node to provide network attached storage, in accordance with some embodiments.

The embodiments below describe a storage cluster that stores user data, such as user data originating from one or more user or client systems or other sources external to the storage cluster. The storage cluster distributes user data across storage nodes housed within a chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

Authorities, implemented in storage nodes in the storage cluster, process transactions associated with operations. Each transaction is accompanied by or associated with a token, which gives permission to execute the transaction. The authorities are able to maintain a pre-transaction state of the system until completion of the operation. This is accomplished without a global lock across the system, and also enables restart of an operation in case of a disruption or other failure. Various system aspects are discussed below with reference to FIGS. 1-3. Execution of transactions, using tokens, is described with reference to FIGS. 4-6.

The storage cluster is contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as Peripheral Component Interconnect (PCI) Express, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system (NFS), common internet file system (CIFS), small computer system interface (SCSI) or hypertext transfer protocol (HTTP). Translation from the client protocol may occur at the switch, chassis external communication bus or within each storage node.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, dynamic random access memory (DRAM) and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded central processing unit (CPU), solid state storage controller, and a quantity of solid state mass storage, e.g., between 2-32 terabytes (TB) in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory (MRAM) that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

FIG. 1 is a perspective view of a storage cluster 160, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 160, each having one or more storage nodes 150, in a flexible and reconfigurable arrangement of both the physical components and the amount of storage memory provided thereby. The storage cluster 160 is designed to fit in a rack, and one or more racks can be set up and populated as desired for the storage memory. The storage cluster 160 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in FIG. 1, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 158 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 1, storage cluster 160 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 2:
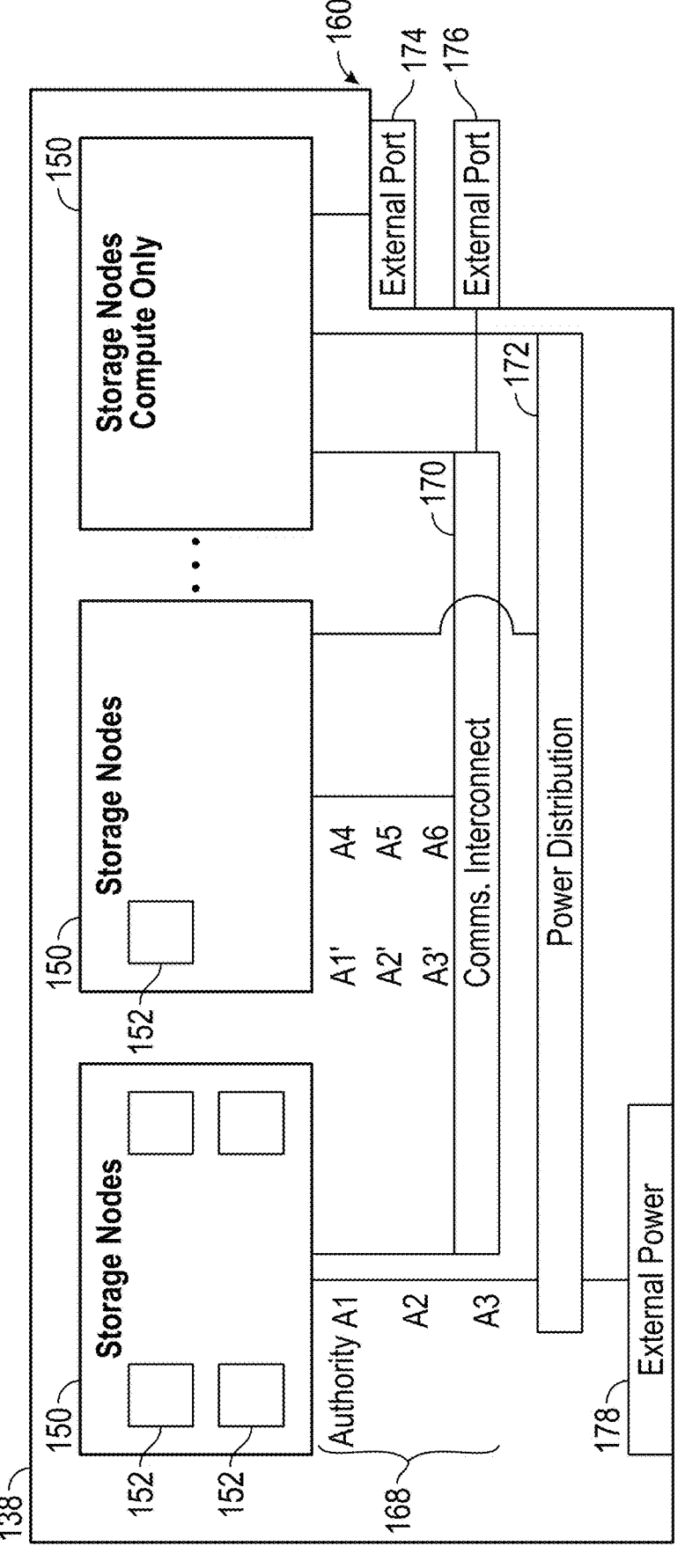
FIG. 2 is a block diagram showing an interconnect switch coupling multiple storage nodes in accordance with some embodiments.

FIG. 2 is a block diagram showing a communications interconnect 170 and power distribution bus 172 coupling multiple storage nodes 150. Referring back to FIG. 1, the communications interconnect 170 can be included in or implemented with the switch fabric 146 in some embodiments. Where multiple storage clusters 160 occupy a rack, the communications interconnect 170 can be included in or implemented with a top of rack switch, in some embodiments. As illustrated in FIG. 2, storage cluster 160 is enclosed within a single chassis 138. External port 176 is coupled to storage nodes 150 through communications interconnect 170, while external port 174 is coupled directly to a storage node. External power port 178 is coupled to power distribution bus 172. Storage nodes 150 may include varying amounts and differing capacities of non-volatile solid state storage 152 as described with reference to FIG. 1. In addition, one or more storage nodes 150 may be a compute only storage node as illustrated in FIG. 2. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 1 and 2, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIG. 5) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage unit 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check (LDPC) code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing (RUSH) family of hashes, including Controlled Replication Under Scalable Hashing (CRUSH). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 3:
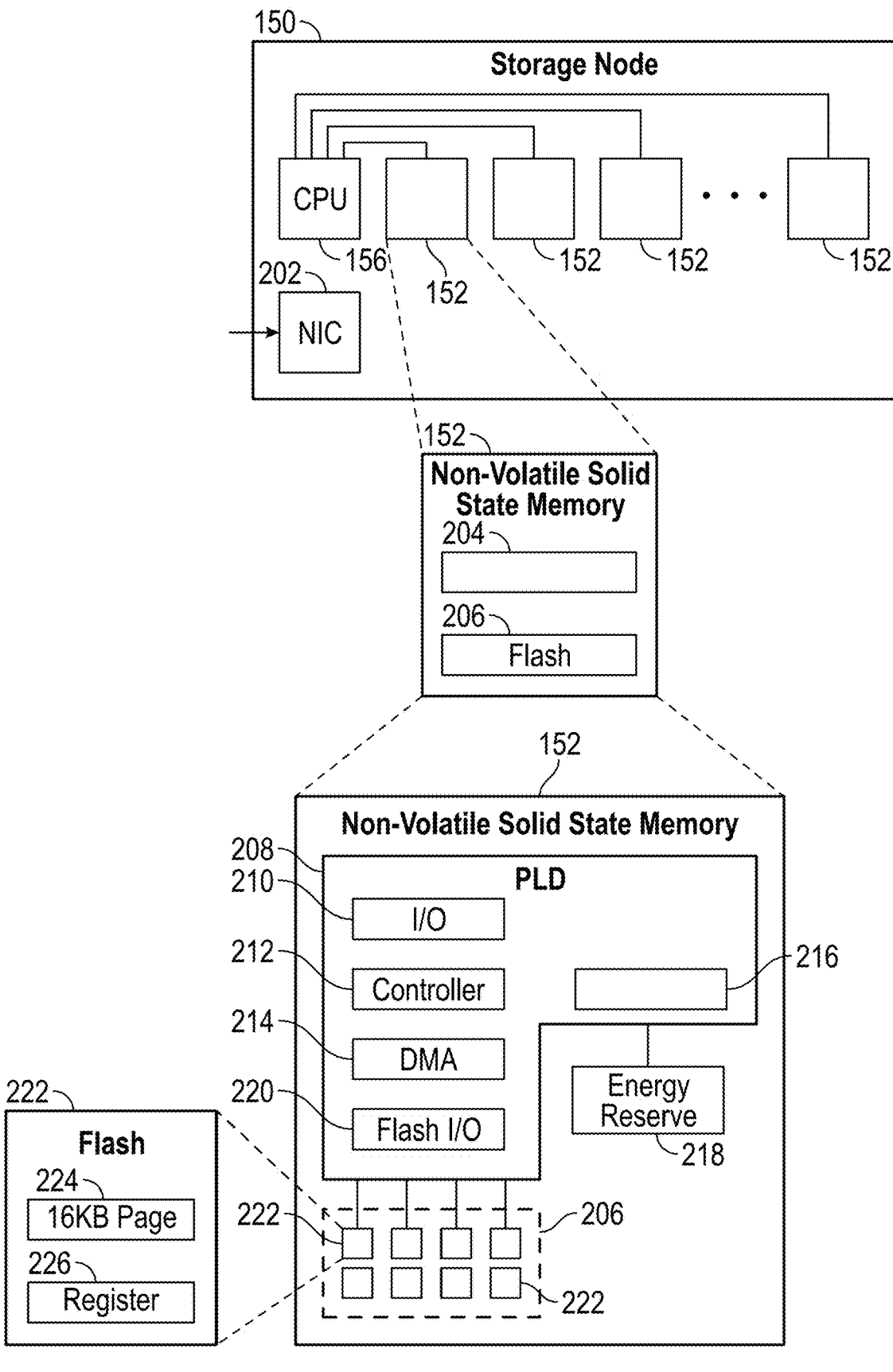
FIG. 3 is a multiple level block diagram, showing contents of a storage node and contents of one of the non-volatile solid state storage units in accordance with some embodiments.

FIG. 3 is a multiple level block diagram, showing contents of a storage node 150 and contents of a non-volatile solid state storage 152 of the storage node 150. Data is communicated to and from the storage node 150 by a network interface controller (NIC) 202 in some embodiments. Each storage node 150 has a CPU 156, and one or more non-volatile solid state storage 152, as discussed above. Moving down one level in FIG. 3, each non-volatile solid state storage 152 has a relatively fast non-volatile solid state memory, such as nonvolatile random access memory (NVRAM) 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 3, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device (PLD) 208, e.g., a field programmable gate array (FPGA). In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 160, in various embodiments as disclosed herein, can be contrasted with storage arrays in general. The storage nodes 150 are part of a collection that creates the storage cluster 160. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 152 described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 160, as described herein, multiple controllers in multiple storage units 152 and/or storage nodes 150 cooperate in various ways (e.g., for erasure coding, data sharding, metadata communication and redundancy, storage capacity expansion or contraction, data recovery, and so on).

Figure 4:
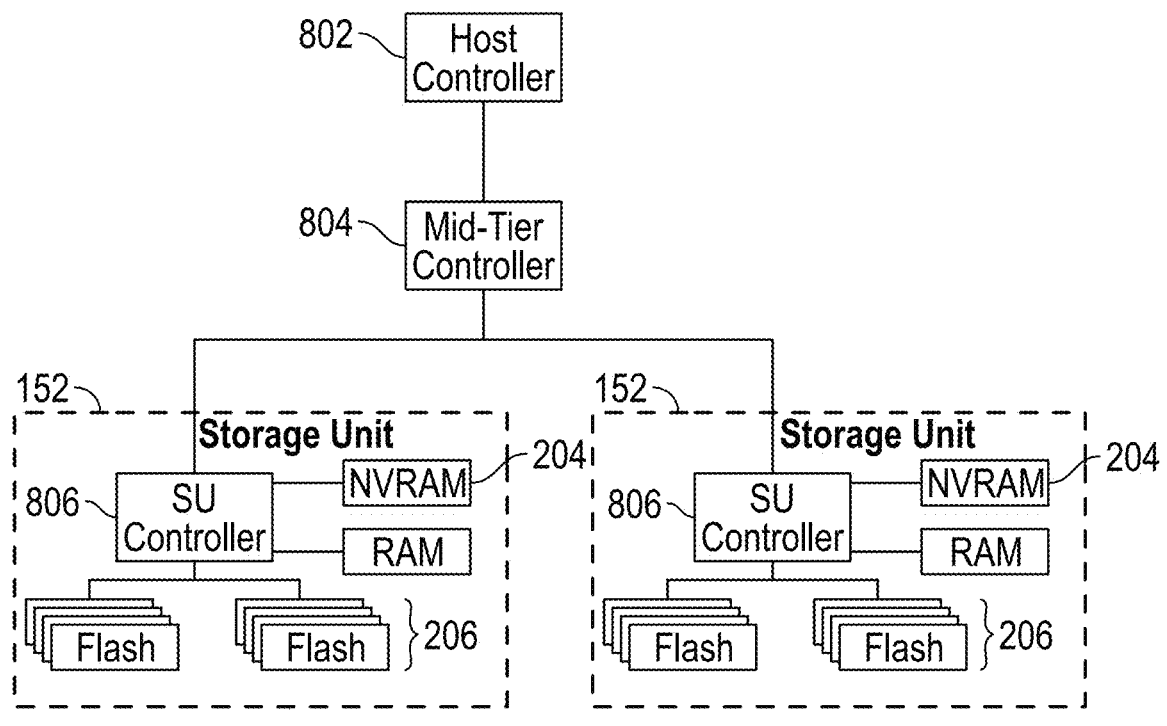
FIG. 4 shows a storage server environment, which uses embodiments of the storage nodes and storage units of FIGS. 1-3 in accordance with some embodiments.

FIG. 4 shows a storage server environment, which uses embodiments of the storage nodes 150 and storage units 152 of FIGS. 1-3. In this version, each storage unit 152 has a processor such as controller 212 (see FIG. 3), an FPGA (field programmable gate array), flash memory 206, and NVRAM 204 (which is super-capacitor backed DRAM 216, see FIGS. 2 and 3) on a PCIe (peripheral component interconnect express) board in a chassis 138 (see FIG. 1). The storage unit 152 may be implemented as a single board containing storage, and may be the largest tolerable failure domain inside the chassis. In some embodiments, up to two storage units 152 may fail and the device will continue with no data loss.

The physical storage is divided into named regions based on application usage in some embodiments. The NVRAM 204 is a contiguous block of reserved memory in the storage unit 152 DRAM 216, and is backed by NAND flash. NVRAM 204 is logically divided into multiple memory regions written for two as spool (e.g., spool_region). Space within the NVRAM 204 spools is managed by each authority 402 independently. Each device provides an amount of storage space to each authority 402. That authority 402 further manages lifetimes and allocations within that space. Examples of a spool include distributed transactions or notions. When the primary power to a storage unit 152 fails, onboard super-capacitors provide a short duration of power hold up. During this holdup interval, the contents of the NVRAM 204 are flushed to flash memory 206. On the next power-on, the contents of the NVRAM 204 are recovered from the flash memory 206.

As for the storage unit controller, the responsibility of the logical "controller" is distributed across each of the blades containing authorities 402. This distribution of logical control is shown in FIG. 4 as a host controller 802, mid-tier controller 804 and storage unit controller(s) 806. Management of the control plane and the storage plane are treated independently, although parts may be physically co-located on the same blade. Each authority 402 effectively serves as an independent controller. Each authority 402 provides its own data and metadata structures, its own background workers, and maintains its own lifecycle.

Figure 5:
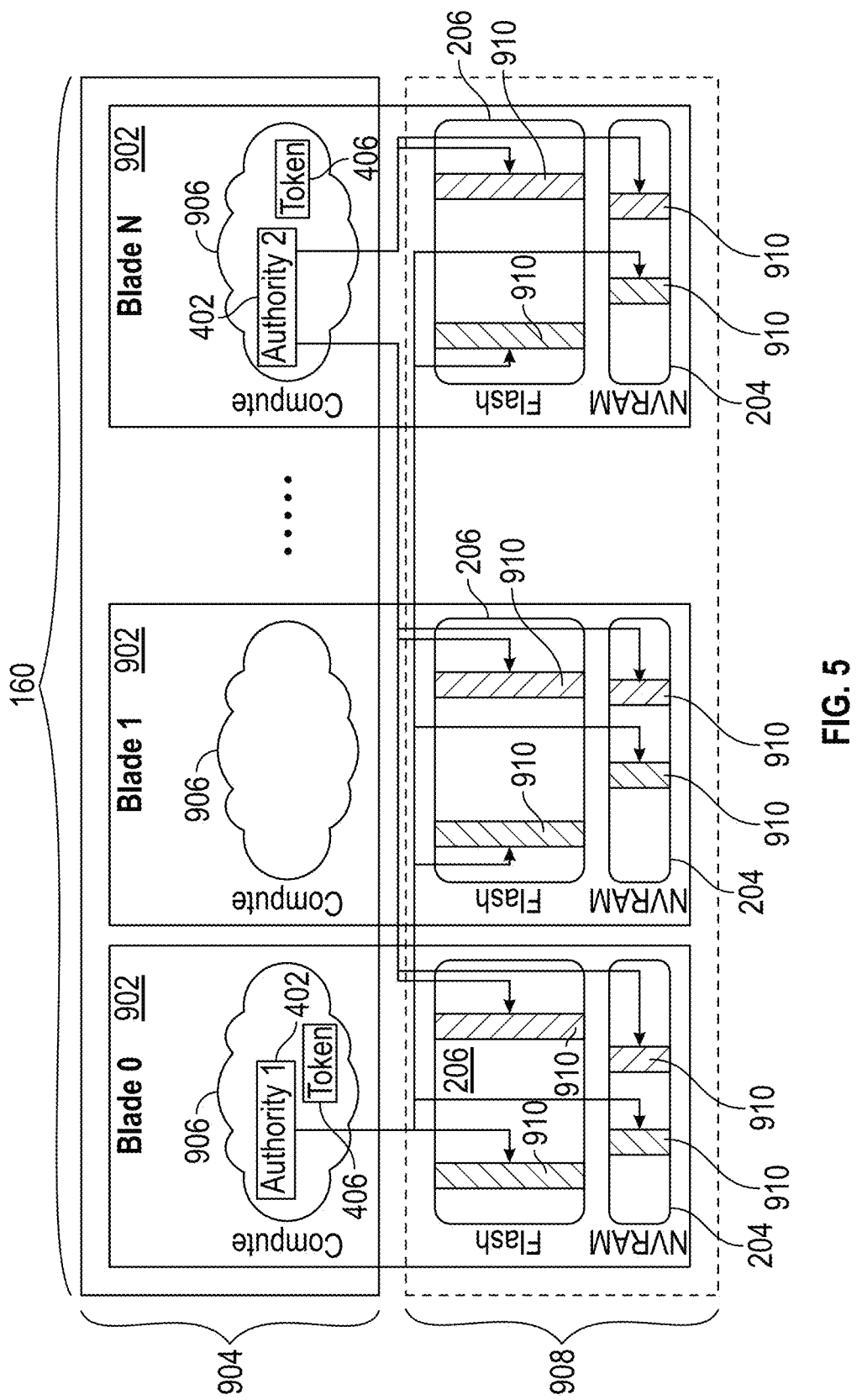
FIG. 5 is a blade hardware block diagram, showing a control plane, compute and storage planes, and authorities interacting with underlying physical resources to perform distributed transactions with token-associated execution, in accordance with some embodiments.

FIG. 5 is a blade 902 hardware block diagram, showing a control plane 904, compute and storage planes 906, 908, and authorities 402 interacting with underlying physical resources to perform distributed transactions with token-associated execution, using embodiments of the storage nodes 150 and storage units 152 of FIGS. 1-3 in the storage server environment of FIG. 4. The control plane 904 is partitioned into a number of authorities 402 which can use the compute resources in the compute plane 906 to run on any of the blades 902. The storage plane 908 is partitioned into a set of devices, each of which provides access to flash 206 and NVRAM 204 resources.

In the compute and storage planes 906, 908 of FIG. 5, the authorities 402 interact with the underlying physical resources (i.e., devices). From the point of view of an authority 402, its resources are striped over all of the physical devices. From the point of view of a device, it provides resources to all authorities 402, irrespective of where the authorities happen to run. In order to communicate and represent the ownership of an authority 402, including the right to record persistent changes on behalf of that authority 402, the authority 402 must provide some evidence of authority ownership that can be independently verifiable. A token 406 is employed for this purpose and function in one embodiment.

One possibility for representing the authority token 406 would be to globally propagate each renewed token 406 out to each server and device in the storage cluster 160. Doing so would require a prohibitively large number of communications that would scale proportionally with the number of servers. Additionally, pushing active updates to globally communicate new tokens 406 presents challenges for ensuring that the authority ownership can be safely advanced in the absence of positive communication (e.g., in the case of partial network partitioning). A solution to the above problems and constraints is to establish that an authority ownership token 406 is a time-bounded lease. The authority ownership and duration of the lease are represented by expressing the expiration time of the token 406. This provides the desired properties that the token 406 can be independently validated without requiring a coordinated global update in order to evolve (or revoke) authority ownership.

FIG. 5 shows authorities 402 in a storage cluster 160 executing transactions, using tokens 406. Each authority 402 has allocated or has been allocated one or more partitions 910 of storage memory in the storage units 152, e.g. partitions 910 in flash memory 206 and NVRAM 204. Each authority 402 uses the respective allocated partitions 910, for writing or reading data. Authorities can be associated with differing amounts of physical storage of the system in some embodiments. For example, one authority 402 could have a larger number of partitions 910 or larger sized partitions 910 in one or more storage units 152 than one or more other authorities 402.

An operation or command involving user data or metadata could originate at one of the authorities 402, or could originate external to the storage cluster 160, for example an I/O request or other command. The operation could be executed by the authority 402 generating or receiving it, or could be forwarded to another authority 402 or even generated by multiple authorities 402 and handed to an authority 402. Each operation can include one or more transactions. Transaction processing, for an operation or command, is discussed below in general terms, and followed by illustration in the form of an example.

Transaction information, associated with an operation, is provided to one or more authorities 402, so that each such authority 402 can execute one or more transactions. In some embodiments, the transaction information includes data that enables a restart of the operation. A token 406 is assigned to each transaction and the authority 402 associated with the transaction. This assignment can be done by the authority 402 that receives the transaction information and executes the transaction. In some embodiments, each token 406 is specific to a respective transaction. In other embodiments, the token 406 is specific to the operation and a copy of the token 406 is assigned to or accompanies each transaction for the operation. Each transaction may be executed in accordance with the dependencies described in the transaction information, by the authority 402 that receives the transaction information for that transaction. In some embodiments, while this is occurring, the system maintains a pre-transaction state of the system, with respect to that operation. Transactions, or portions of transactions, can be processed in parallel, while a consistent view is provided across the system. Multiple commands, each with multiple transactions, can be processed through multiple authorities in parallel. Any inquiry as to system state receives a consistent answer, and any failure during transaction processing leaves the system in the pre-transaction state for consistent recovery from the failure.

The authority 402 that owns the transaction (for example, an authority 402 identified as $A_1$) communicates to each of the other authorities (for example, authorities 402 identified as $A_2$ through $A_n$) to begin their respective portions of the transaction. Then each of the other authorities, $A_2$ through $A_n$, in turn, prepare any changes they might have to make for the transaction and pass that information along with a token that the other authorities ($A_2$ through $A_n$) generated back to the authority 402 A1, that owns the transaction. Authority A1 that owns the transaction then commits the entire set of changes to NVRAM 204 of the storage unit 152 as collected from each of the other authority ($A_2$ through $A_n$) along with the tokens 406 that they provided to the storage devices. The token 406 provides proof to the storage tier that the update to that authority's data is still allowed (protecting against delays in message transmission or authority failovers, etc.). The authority 402 that is committing the entire set of changes to the NVRAM 204 writes the data and/or metadata associated with that transaction, and the token 406 associated with that transaction, into a partition 910 in a storage unit 152 associated with that authority 402. Each of the authorities 402 is capable of receiving transaction information and generating a token 406, executing the transaction and communicating changes for the transaction, and the token 406, to the authority 402 that owns the transaction. Each of the authorities 402 can receive commands, and each of the authorities 402 can act as a transaction authority for any authority receiving commands. In some embodiments, each of the tokens 406 has a validity interval and/or an expiration time, established at the time of creating the token. A time-based token 406 indicates permission to perform the associated transaction within a time span. In transactions involving data writing, the token 406 permits or enables an authority 402 to write the data into a partition that is allocated to that authority 402. If a token 406 expires, and the corresponding transaction has not been performed, the system is maintained at the pre-transaction state. That is, the operation itself is not committed if any transaction of the operation has not been completed by the time a corresponding token 406 associated with that transaction expires. Any of the authorities 402, and particularly the authority 402 requesting or governing the operation with the multiple transactions, can access tokens 406 to see if a token 406 has expired in some embodiments. Any of the authorities 402 can check to see if data has been written to a partition 910. Writing data associated with each of one or more transactions for a command indicates that the command is committed. That is, the command is committed once each transaction of the command is written into an allocated partition of the storage device. It should be appreciated that this feature is useful in determining system state, for replies to inquiries, and is also useful in recovery from failure. In some embodiments, an authority 402 executing a transaction (i.e., a transaction authority 402) logs the transaction, for example by writing a log in NVRAM 204. The log can be persisted, and can be accessed by other authorities 402 to assist in recovery from failure. In an alternate embodiment, an authority 402 that owns a transaction can write the associated token 406 into the corresponding partition 910 assigned to the authority that owns the transaction. One or more of the above mechanisms and techniques is used in various embodiments, to maintain and determine a consistent system state.

After all of the transactions of an operation that has multiple transactions have completed, with verification available using one of the above-described mechanisms, the system can transition to a post-transaction state. The system considers the operation complete and committed only when all of the transactions associated with a particular operation have been executed, e.g., data written into allocated portions of the storage device, as permitted by a corresponding token, and only then does the system transition to the post-transaction state with respect to that operation or command. In embodiments using optimistic transaction execution that turn out to be based on premises later found not valid at the time of the optimistic execution are revised or returned to an original state.

As an example of transaction processing using tokens 406 in a storage cluster 106, consider an I/O request or command to move a file from one directory to another directory. A storage node 150 receiving the I/O request sends information to another authority 402, for example the authority 402 labeled "A1". This authority 402 A1 takes ownership of the operation, breaks down the operation, namely the I/O request, into multiple transactions, and sends transaction information to each of the authorities 402 affected by the operation. An authority 402 that has ownership of the first directory receives transaction information to delete the reference to the affected file from the first directory, for the file move in this example. An authority 402 that has ownership of the second directory receives transaction information to add reference to the affected file to the second directory, for the file move. The authorities 402 that are executing the transactions generate tokens 406 associated with the transactions and send the tokens along with transaction information and information about changes they have to make for any transaction back to the authority that owns the transaction. The authority that owns the transaction commits the entire set of changes along with the tokens 406 to the partition 910 in the NVRAM 204. As noted above, each of the tokens 406 may be time bound and permit an authority write access to an allocated partition in a storage device. While the transactions are being executed, the system maintains the pre-transaction state, which shows, in this example that the affected file is under the first directory. Only after all transactions associated with the operation of moving the file from the first directory to the second directory have been executed, does the system show the post-transaction state, which is that the file has been moved from under the first directory to under the second directory. All of these transactions are performed without a global lock, so that other transactions of other commands can be performed in parallel with the transactions associated with moving a file from under one directory to under another directory. Any other transactions or commands will see a consistent state of the system. Any time there is a disruption or a failure, the system can recover to whichever consistent system state is in place. Any of the authorities 402 can read data in partitions 910, authority logs, or tokens 406, and can determine what that consistent system state should be, for purposes of inquiries or recovery. Since this information is available for access by authorities 402, there is no need for broadcasting completion of any of the transactions or the operation in the distributed storage system. Similar examples of other types of operations or commands, such as writing a file, reading a file, deleting a file, copying a file and so on, with associated transactions, tokens, and system states, are readily devised.

FIG. 6 is a flow diagram of a method for processing transactions associated with a command, which can be practiced in the storage cluster of FIGS. 1-5 and further embodiments thereof. Some or all of the actions in the method can be performed by various processors, such as processors in storage nodes or processors in storage units. In an action 602, partitions in storage devices are allocated to authorities. A command is received at a first authority, in an action 604. A pre-transaction state of the system is maintained, in an action 606. In an action 608, a transaction, relating to the command, is sent from the first authority to a second authority. The transaction is accompanied by or associated with a token which can be generated by the second authority. The token is specific to the transaction and indicates in some embodiments that the authority executing the transaction has permission to perform the transaction and is permitted to write data to an allocated partition of a storage device. In an action 610, data is written into a partition in memory of a storage device, by the second authority in accordance with the transaction, and as permitted by the token.

In a decision action 612, it is determined whether the operation is complete. If all transactions associated with the operation have been executed, the operation is considered complete, and flow proceeds to the action 614. Completion of all of the transactions of an operation can be determined through one of the mechanisms described with reference to FIG. 5, such as all of the data associated with each transaction of the command being written into respective allocated portions of a storage device. If the operation is not complete, flow branches back to the decision action 612 to await completion of all the transactions. In the action 614, the system transitions to a post-transaction state of the system.

Figure 7:
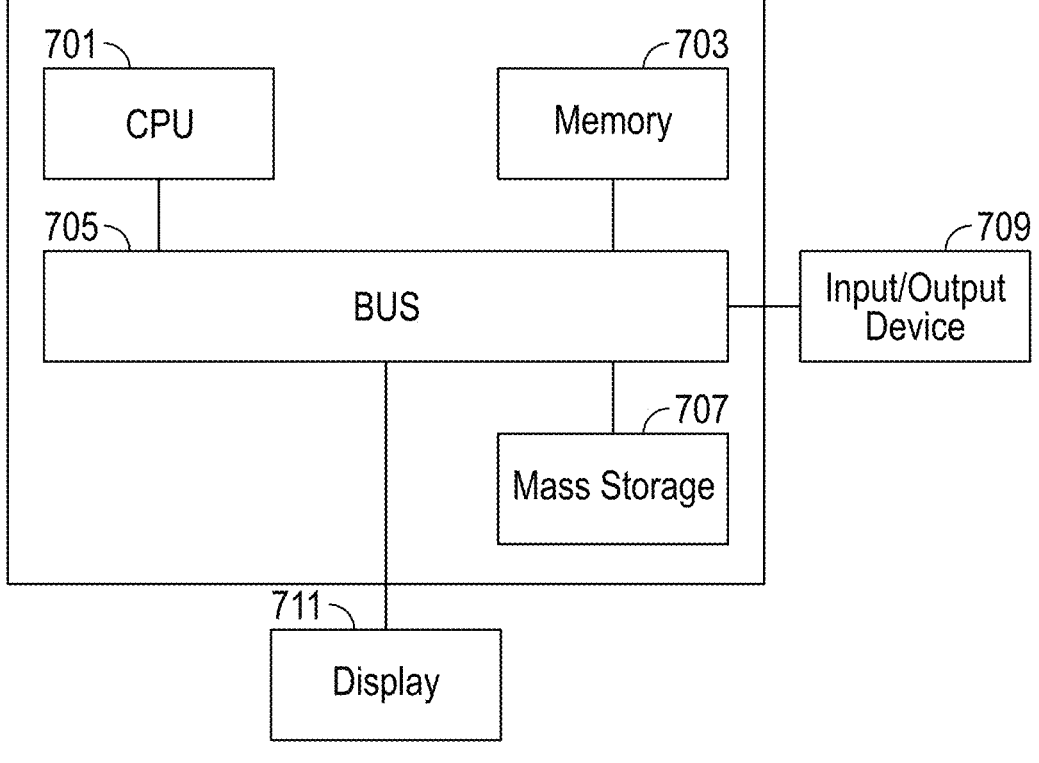
FIG. 7 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 7 is an illustration showing an exemplary computing device which may implement the embodiments described herein. The computing device of FIG. 7 may be used to perform embodiments of the functionality for distributed transaction processing in accordance with some embodiments. The computing device includes a central processing unit (CPU) 701, which is coupled through a bus 705 to a memory 703, and mass storage device 707. Mass storage device 707 represents a persistent data storage device such as a floppy disc drive or a fixed disc drive, which may be local or remote in some embodiments. The mass storage device 707 could implement a backup storage, in some embodiments. Memory 703 may include read only memory, random access memory, etc. Applications resident on the computing device may be stored on or accessed via a computer readable medium such as memory 703 or mass storage device 707 in some embodiments. Applications may also be in the form of modulated electronic signals modulated accessed via a network modem or other network interface of the computing device. It should be appreciated that CPU 701 may be embodied in a general-purpose processor, a special purpose processor, or a specially programmed logic device in some embodiments.

Display 711 is in communication with CPU 701, memory 703, and mass storage device 707, through bus 705. Display 711 is configured to display any visualization tools or reports associated with the system described herein. Input/output device 709 is coupled to bus 705 in order to communicate information in command selections to CPU 701. It should be appreciated that data to and from external devices may be communicated through the input/output device 709. CPU 701 can be defined to execute the functionality described herein to enable the functionality described with reference to FIGS. 1-6. The code embodying this functionality may be stored within memory 703 or mass storage device 707 for execution by a processor such as CPU 701 in some embodiments. The operating system on the computing device may be iOS™, MS-WINDOWS™, OS/2™, UNIX™, LINUX™, or other known operating systems. It should be appreciated that the embodiments described herein may also be integrated with a virtualized computing system implemented with physical computing resources. Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
generating a transaction of a command received by a storage system, wherein a token is associated with the transaction, the token indicative that an owner of the transaction has permission to perform the transaction; and
writing data into a partition of storage memory in a storage node of the storage system that is allocated to the owner in accordance with the transaction, wherein command processing and transaction processing are achieved by avoiding a global lock on the storage system.

2. The method of claim 1, wherein the token is generated by the owner.

3. The method of claim 1, wherein while each transaction associated with the command is being executed, the system maintains a pre-transaction state.

4. The method of claim 1, wherein:

the token is time-based.

5. The method of claim 1, further comprising:

processing multiple commands, each having multiple transactions, through multiple owners in parallel, wherein the writing data associated with each of the multiple transactions for one of the multiple commands indicates the one of the multiple commands is committed.

6. The method of claim 1, wherein:

avoiding broadcasting completion of the transaction throughout the storage system.

7. The method of claim 1, further comprising:

committing the command once each transaction of the command is written into an allocated partition.

8. A tangible, non-transitory, computer-readable media having instructions thereupon which, when executed by a processor, cause the processor to perform a method comprising:

generating a transaction of a command received by a storage system, wherein a token is associated with the transaction, the token indicative that an owner of the transaction has permission to perform the transaction; and writing data into a partition of storage memory in a storage node of the storage system that is allocated to the owner in accordance with the transaction, wherein command processing and transaction processing are achieved by avoiding a global lock on the storage system.

9. The computer-readable media of claim 8, wherein the token is generated by the owner.

10. The computer-readable media of claim 8, wherein while each transaction associated with the command is being executed, the system maintains a pre-transaction state.

11. The computer-readable media of claim 8, wherein:

the token is time-based.

12. The computer-readable media of claim 8, wherein the method further comprises:

processing multiple commands, each having multiple transactions, through multiple owners in parallel, wherein the writing data associated with each of the multiple transactions for one of the multiple commands indicates the one of the multiple commands is committed.

13. The computer-readable media of claim 8, wherein:

broadcasting completion of the transaction throughout the storage system is avoided.

14. The computer-readable media of claim 8, wherein the method further comprises:

committing the command once each transaction of the command is written into an allocated partition.

15. A storage system, comprising:

a memory; and a processing unit having a processor configured to execute actions, the actions comprising:

generating a transaction of a command received by a storage system, wherein a token is associated with the transaction, the token indicative that an owner of the transaction has permission to perform the transaction; and writing data into a partition of storage memory in a storage node of the storage system that is allocated to the owner in accordance with the transaction, wherein command processing and transaction processing are achieved by avoiding a global lock on the storage system.

16. The storage system of claim 15, wherein the token is generated by the owner.

17. The storage system of claim 15, wherein while each transaction associated with the command is being executed, the system maintains a pre-transaction state.

18. The storage system of claim 15, wherein:

the token is time-based.

19. The storage system of claim 15, wherein the actions further comprise:

processing multiple commands, each having multiple transactions, through multiple owners in parallel, wherein the writing data associated with each of the multiple transactions for one of the multiple commands indicates the one of the multiple commands is committed.

20. The storage system of claim 15, wherein:

broadcasting completion of the transaction throughout the storage system is avoided.

* * * * *